United States Patent [19]

Ford et al.

[11] E Re. 31,553

[45] Reissued Apr. 17, 1984

[54] PIVOT AND GUIDE ROD ASSEMBLY FOR BI-FOLD DOOR

[75] Inventors: Ralph E. Ford, Harper Woods; Kim W. Wright, Roseville, both of Mich.

[73] Assignee: Slimfold Manufacturing Company, Inc., Dothan, Ala.

[21] Appl. No.: 172,255

[22] Filed: Jul. 25, 1980

Related U.S. Patent Documents

Reissue of:

[64] Patent No.: 3,810,274
Issued: May 14, 1974
Appl. No.: 382,486
Filed: Jul. 25, 1973

[51] Int. Cl.[3] ..... E05D 5/12

[52] U.S. Cl. ..... 16/380; 160/118; 160/206

[58] Field of Search ..... 160/118, 199, 206; 16/168, 169, 171, 131

[56] References Cited

U.S. PATENT DOCUMENTS

| | | | |
|---|---|---|---|
| 1,230,345 | 6/1917 | Urmson . | |
| 1,245,042 | 10/1917 | Schoening et al. . | |
| 1,612,499 | 12/1926 | Etheredge . | |
| 2,186,789 | 1/1940 | Rosenberg | 16/176 |
| 2,249,329 | 7/1941 | Rosenberg | 16/176 |
| 2,804,136 | 8/1957 | Ternes et al. | 160/199 |
| 2,898,987 | 8/1959 | Ford | 160/206 |
| 2,943,675 | 7/1960 | Ford | 160/206 |
| 3,019,836 | 2/1962 | Leigh | 160/199 |
| 3,054,447 | 9/1962 | Brydolf | 160/206 |
| 3,095,952 | 7/1963 | Ford . | |
| 3,160,201 | 12/1964 | Johnson | 160/206 |
| 3,162,890 | 12/1964 | Brydolf et al. | 16/129 |
| 3,170,506 | 2/1965 | Johnson | 160/206 |
| 3,187,800 | 6/1965 | Kirby | 160/206 |
| 3,191,214 | 6/1965 | Protzman | 16/87 |
| 3,221,804 | 12/1965 | Rudnick | 160/206 |
| 3,233,657 | 2/1966 | Kirby | 160/206 |
| 3,285,324 | 11/1966 | Stein et al. | 160/206 |
| 3,302,691 | 2/1967 | Andrews et al. | 160/206 |
| 3,372,689 | 3/1968 | Goudy | 160/206 X |
| 3,390,418 | 7/1968 | Sheridan | 160/206 X |
| 3,391,723 | 7/1968 | Kirby | 160/206 |
| 3,394,428 | 7/1968 | Peterson | 16/151 |
| 3,511,300 | 5/1970 | Matyas | 160/206 |
| 3,514,805 | 6/1970 | Foltz | 16/90 |
| 3,543,464 | 12/1970 | Taylor | 52/475 |
| 3,554,267 | 1/1971 | Brinker | 160/118 |
| 3,584,332 | 6/1971 | Taylor | 16/130 |
| 3,634,986 | 1/1972 | Ford et al. | 52/316 |
| 3,957,102 | 5/1976 | Kempel | 160/206 |

FOREIGN PATENT DOCUMENTS

| | | |
|---|---|---|
| 138969 | 2/1903 | Fed. Rep. of Germany . |
| 2063165 | 12/1970 | Fed. Rep. of Germany . |
| 1067937 | 5/1967 | United Kingdom . |

*Primary Examiner*—Kenneth Downey
*Attorney, Agent, or Firm*—Jones & Askew

[57] ABSTRACT

Pivot and guide rod assembly for bi-fold door includes plastic sleeve for mounting in door channel and supporting a pivot rod. A spring is arranged to urge pivot rod outwardly from sleeve, latch means being provided to retain pivot rod in retracted position during shipping and mounting of door.

4 Claims, 5 Drawing Figures

FIG. 2
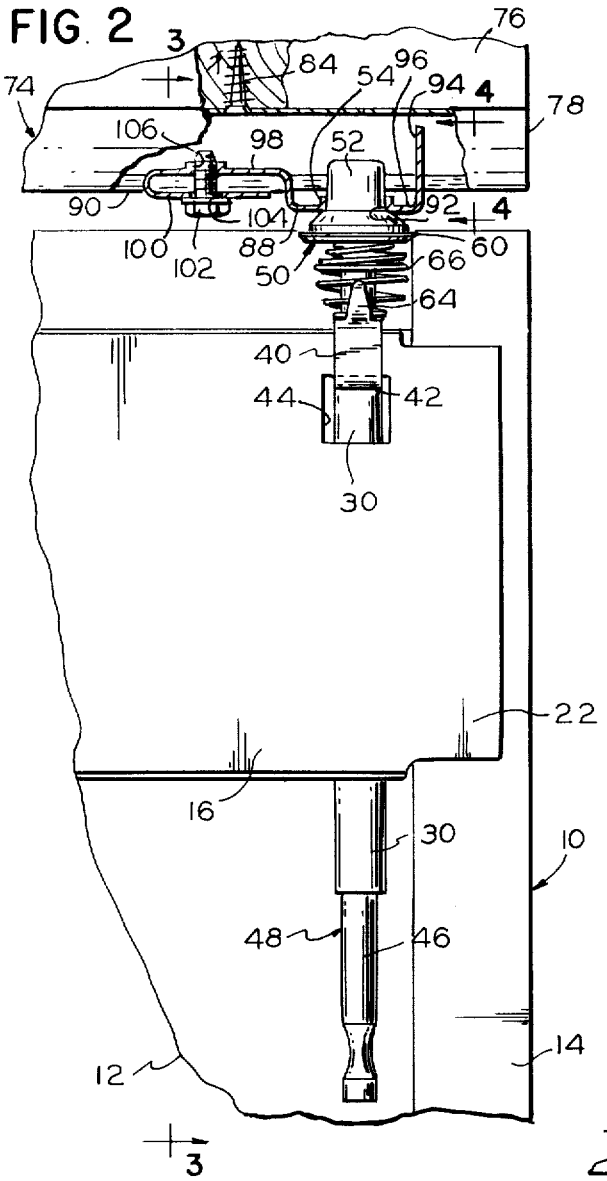
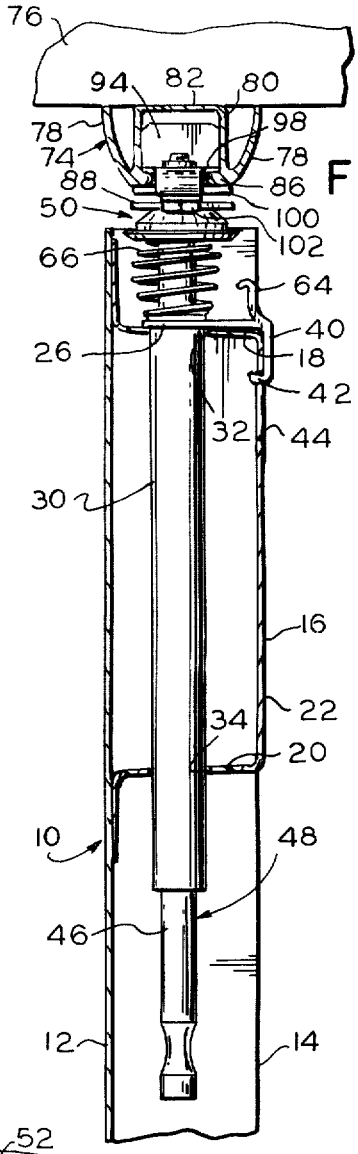
FIG. 3
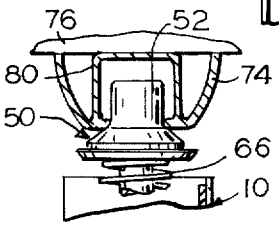
FIG. 5
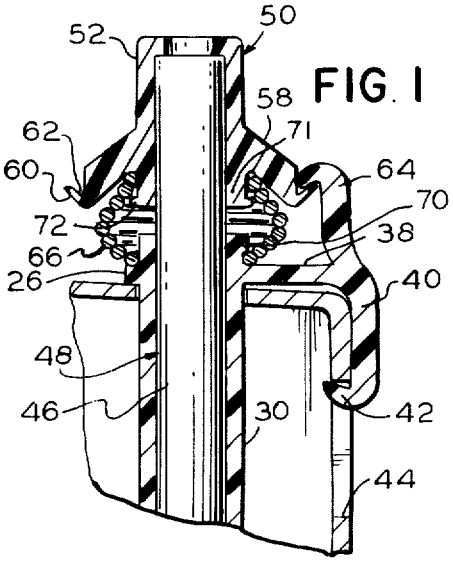
FIG. 1
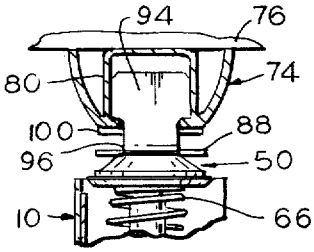
FIG. 4

PIVOT AND GUIDE ROD ASSEMBLY FOR BI-FOLD DOOR

Matter enclosed in heavy brackets [ ] appears in the original patent but forms no part of this reissue specification; matter printed in italics indicates the additions made by reissue.

BACKGROUND OF THE INVENTION

For many reasons so-called bi-folding doors formed of fabricated metal have become popular for enclosing large openings, such as for closets and cabinets. Various fitting arrangements have been provided heretofore for supporting the doors in the opening and guiding them during their opening and closing movement. Some of the prior arrangements have been disadvantageous by reason of the difficulty in assembling the same in the initial door, or installing them, or by reason of lack of adjustment in the device when installed.

BRIEF DESCRIPTION OF THE INVENTION

It is an object of the present invention to provide a pivot assembly for mounting bi-fold doors that overcomes the several disadvantages mentioned above.

More particularly, the present invention is concerned with an upper pivot or guide assembly for use with a bi-fold door having a formed metal face sheet and a stiffening channel secured along one edge of the sheet. The pivot or guide assembly of the invention comprises an elongated plastic sleeve which is adapted to extend through openings in the flanges of the stiffening channel, the sleeve having means operatively arranged to engage the channel to retain the sleeve therein. A pivot rod is provided which includes a shank portion positioned within the sleeve and slidable longitudinally therein. The pivot rod is provided with an enlarged head portion and a compression spring is operatively arranged between the head portion of the rod and an end of the sleeve for urging the head portion away from the sleeve. A latch means is provided for releasably engaging such head portion and retaining the same in close proximity to the end of the sleeve during shipment and assembly of the door. The latch means is adapted to easily disengage to permit release of the head portion and the pivot rod to be pushed partially outwardly of the sleeve. In the outward position the head portion is adapted to engage within a socket or track as selected so as to retain the door in operative position.

DRAWINGS

In the drawings:

FIG. 1 is an enlarged sectional view through a pivot rod assembly and a portion of a door illustrating the pivot rod assembly in its retracted position prior to installation of a door;

FIG. 2 is an elevation of a corner of a door assembly showing the pivot rod assembly in its extended, operative position;

FIG. 3 is a sectional view taken substantially along line 3—3 of FIG. 2;

FIG. 4 is a sectional view taken along line 4—4 of FIG. 2; and

FIG. 5 is a fragmentary view showing the arrangement of the pivot rod and track when used as a guide.

DETAILED DESCRIPTION OF THE INVENTION

The invention is particularly concerned with an improved construction of bi-fold or folding door construction such as is shown in U.S. Pat. Nos. 2,898,987 and 2,943,675. Doors of this nature comprise a pair of door sections which are pivotally secured at the left and righthand sides of a closet opening or doorway. Each door section comprises a pair of panels, an outside panel which is vertically pivoted adjacent one side of the closet opening, and an inside panel which is pivotally connected to the outside panel. Each door section functions to open and close one half the closet opening. Guide means, including an upper or lower track, or both, serves as a pivot support for the outside panel and as a guide for the inside panel to the door units when in their opening and closing movements. Because this general construction is well known and is shown in the prior art including such patents, only the particular details of the door construction as modified in this invention are illustrated herein.

Illustrated in the drawing is a portion of an outside panel 10 of such a door which is fabricated of sheet steel and which includes a face sheet 12 the vertical edges of which are formed to provide inturned channels 14 along the vertical edges. Along the top and bottom of each panel additional stiffening is provided in the form of transverse hat sections or stiffening channels 16 which comprise flanges 18 and 20 extending substantially vertically outwardly from the surface of the face sheet 12 and a connecting web 22. The channels 16 are suitably secured as by welding to the face sheet 12.

The pivot assembly of the invention comprises an elongated plastic sleeve 30 of nylon or other suitable material which extends through cooperating openings 32, 34 in the flanges 18, 20, respectively. Formed on the upper end of the sleeve is an integral collar 26 which abuts the outer surface of the flange 18 adjacent the upper edge of the panel 10. An integral post 38 extends outwardly from one side of the collar substantially perpendicularly to the sleeve 30, the post having an integral arm 40 extending downwardly over the web 22 substantially parallel to the axis of the sleeve 30. The arm 40 is provided with a finger 42 on the end thereof which extends inwardly toward the sleeve and engages in an opening 44 in the web 22 to retain the sleeve in the channel 16. It will be apparent that the sleeve 30 is mounted in the channel by sliding the sleeve through the openings 32, 34. The post 38 and arm 40 have sufficient resiliency to bend the arm outwardly as the sleeve is slid into place until the finger 42 is abreast of the opening 44 at which time it snaps into place and releasably holds the sleeve in position.

The sleeve 30 is adapted to receive the shank portion 46 of a pivot or guide rod 48. The pivot rod shank 46 is of such diameter that it may slide longitudionally within the sleeve 30. The upper end of the pivot or guide rod 48 is provided with an enlarged head portion 50 which may be of nylon or other suitable plastic firmly secured as by a press fit to the end of the shank 46. The head portion 50 comprises an upper cylindrical pivot head 52 adapted to be received within a suitable socket 54 suitably supported on the door frame. The head portion 50 also includes a frusto-conical flange 58 projecting outwardly and downwardly, the flange 58 having a lip 60 on the outer edge thereof defining a peripheral notch or cup 62. The cup 62 is adapted releasably to receive the end of a latch 64 integral with and extending from the post 38 as best shown in FIG. 1. Since both the lip 60 and the latch 64 are resilient, upward force upon the rod 46 will tend to cause deflection of these components to release the rod and to permit it to move upwardly relative to the sleeve.

Means are provided to urge the pivot rod 48 upwardly or outwardly with respect to the sleeve 30. Such means comprises a compression spring 66, the lower end of which surrounds the upper end of the sleeve 30 immediately above the collar 26 and is removably retained thereon by a plurality of projections 70 each extending outwardly from the surface of the sleeve to engage the lower turn of the spring. The upper end of the spring 66 surrounds the lower end 71 of the head portion 50 which is likewise provided with a plurality of projections 72 releasably to engage a portion of the spring.

The pivot socket 54 may be suitably mounted in any manner within a track 74 suitably secured to the door frame or header 76. The illustrated track 74 comprise an extruded metal member including opposite arch-shaped side walls 78 and an inner channel 80 of rectangular cross section. The bottom wall 82 of the channel 80 abuts against the header 76 and the track is suitably secured to the header, such as by screws 84. The track is formed with a pair of opposite lips 86 projecting inwardly from the opposite sides of the track.

Referring to FIGS. 2, 3 and 4 in the illustrated embodiment the pivot socket 54 is a stamped and formed metal member including a flat plate portion 88 adapted to bridge the opposite bottom edges 90 of the track 74 and having an extruded hole 92 therein for receiving the pivot rod head 52. A flange 94 (FIG. 4) extends upwardly from one end of the plate portion 88 and which flange is shaped to fit snugly within channel 80, the flange 94 being connected to the plate portion by a neck 96. The pivot socket 54 is clamped in place by a clamping portion including a top part 98 adapted to engage the upper edges of lips 86 and bottom part 100 adapted to engage the lower edges 90 of the track, the metal member being reversely curved to position the bottom part 100 beneath the top part 98. A screw 102 extends upwardly through hole 104 in the bottom part 100 and is threadedly received in a cooperatively threaded opening 106 in the top part 98, whereby tightening of the screw 102 effects clamping of the parts 98, 100 against the respective track surfaces to fix the position of the pivot socket 54 in the track.

To assemble the pivot rod assembly in a door, the spring 66 and pivot rod 48 are assembled, the pivot rod is inserted into the sleeve and the spring depressed until the latch 64 engages in the cup 62. The sleeve 30 is then inserted through the flange openings 32, 34 until the further 42 on the arm 40 engages in the opening 44. This assembly just described can be done at the factory or it can be done at the job site. It will be apparent the sleeve can be easily removed from a door in the event that it is desired to change the hand of the door at the job site or for any other reason that may occur, simply by prying up the arm 40 so that the finger 42 clears the opening 44.

When a door is positioned in the door opening and the pivot head 52 is positioned beneath the socket 54, the installer needs simply give a sharp tap to the lower end of the pivot rod 48 to effect release of the latch 64 whereupon the spring 66 will push the pivot rod upwardly so that the pivot head 52 engages within the socket 54. The spring 66 will keep the pivot head engaged within the socket as the door is adjusted for height and, of course, accommodates the door to openings of various heights. The extension of the nylon sleeve 30 entirely through the channel 16 eliminates metal-to-metal contact and the long sleeve adds to the smooth operating characteristics by creating with the pivot rod a piston-like action.

It will be apparent the assembly may be used as a guide by mounting the assembly in a similar manner to the inside panels of each door section in which case the pivot head 52 will slide in the channel 80 as shown in FIG. 5. As a guide it may be used either at the upper end of the door or at the lower end.

Having illustrated and described a preferred embodiment of the invention, it should be apparent that it permits of modification and arrangement and detail.

We claim:

1. In a metal door assembly:

a door panel comprising a face sheet, a stiffening channel secured to one surface of said sheet along an edge thereof, said channel having a pair of spaced apart flanges extending outwardly from said surface and a connecting web, a pivot rod assembly mounted in said channel, said assembly comprising an elongated plastic sleeve extending through corresponding openings in said flanges,

*a collar on said sleeve,* sleeve retaining means operatively arranged between said sleeve and said channel to retain said sleeve in said channel, a pivot rod having a shank portion positioned in said sleeve and slidable therein and an enlarged head portion, a compression spring operatively arranged between said channel and said head portion for urging said head portion away from said channel, and releasable latch means operatively arranged between said head portion and said sleeve for releasably retaining said head in a retracted position adjacent said collar.

2. A metal door assembly as set forth in claim 1; said sleeve retaining means comprising an arm integral with said sleeve and releasably engaging in a cooperating notch in said channel web.

3. A metal door assembly as set forth in claim 1;

said releasable latch means comprising a flange on said head portion formed with a lip on the free end thereof, and a latch element on said sleeve adapted to engage said lip, said lip and said latch element being resilient whereby sufficient axial force applied to said pivot rod will cause said lip and latch means to deflect and release said pivot rod for movement under the force of said spring.

4. In a metal door assembly;

a door panel comprising a face sheet, a stiffening channel secured to one surface of said sheet along an edge thereof, said channel having a pair of spaced apart flanges extending outwardly from said surface and a connecting web, a pivot rod assembly mounted in said channel, said assembly comprising an elongated plastic sleeve extending through corresponding openings in said flanges, said sleeve having an integral collar formed on one end thereof abutting the outer surface of the flange adjacent said edge, an integral post extending outwardly from one side of said collar substantially perpendicularly to said sleeve, said post having an integral arm at the outer end thereof extending over said web substantially parallel to said sleeve, said arm having a finger on the end thereof extending inwardly toward said sleeve and engaging in an opening in said web to retain said sleeve in said channel, a pivot rod having a shank portion positioned in said sleeve and slidable therein and an enlarged head portion, a compression spring operatively arranged between said collar and said head portion for urging said head portion away from said collar, said head portion having a peripheral cupped flange thereon, and a latch integral with said post extending from said post and adapted releasably to engage said flange when said head is positioned adjacent said collar thereby to retain said head against movement away from said collar, said head being releasable by applying a sharp blow on the end of said shank portion opposite said head thereby to cam said latch from its flange engaging position.

* * * * *